Dec. 20, 1960   E. C. ELSNER   2,965,409
RELEASE HOOK
Filed April 7, 1958   2 Sheets-Sheet 1
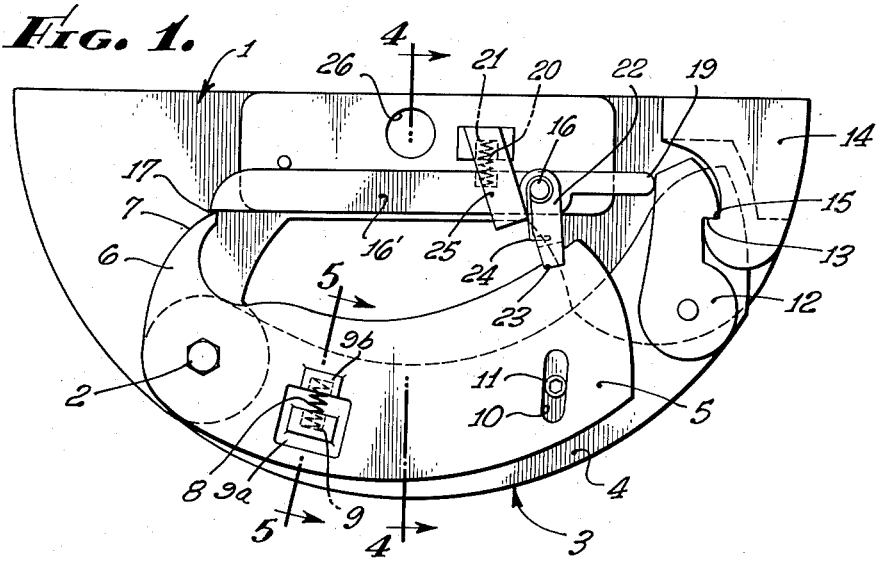
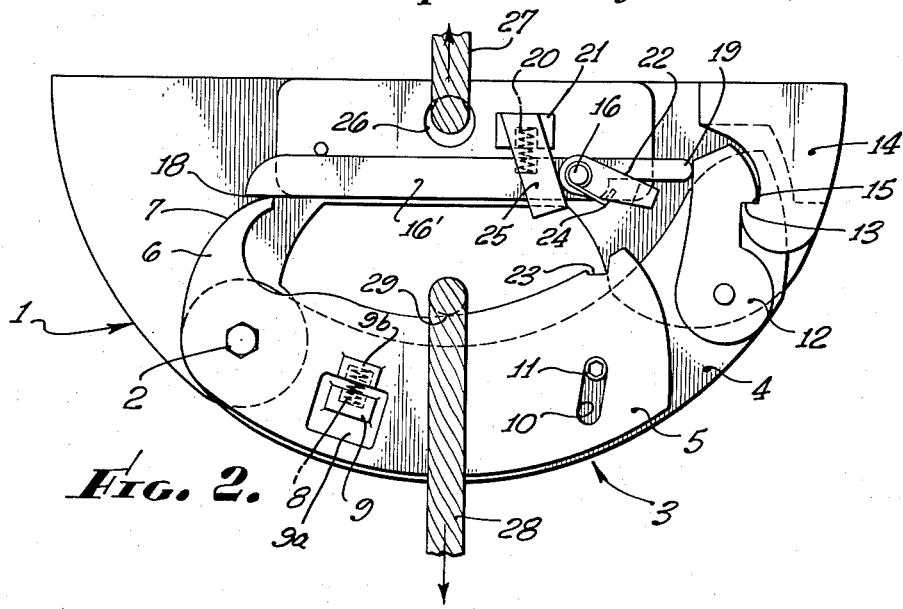
EDWIN C. ELSNER
INVENTOR.
BY
Huebner and Worrel
ATTORNEYS.

Dec. 20, 1960
E. C. ELSNER
2,965,409
RELEASE HOOK
Filed April 7, 1958
2 Sheets-Sheet 2
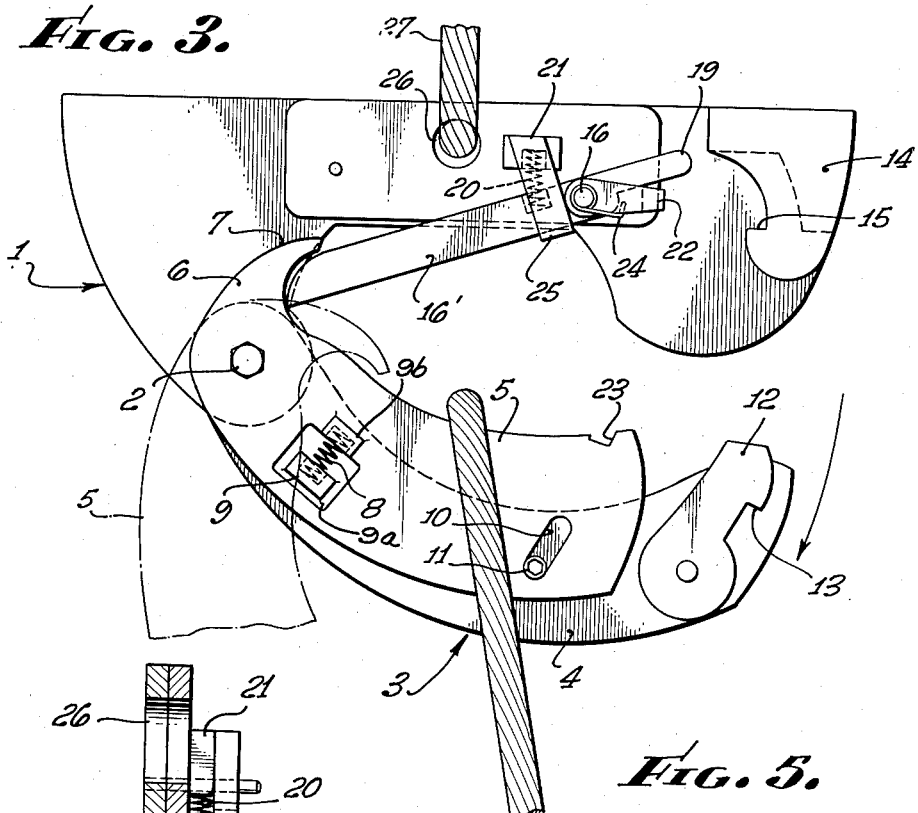
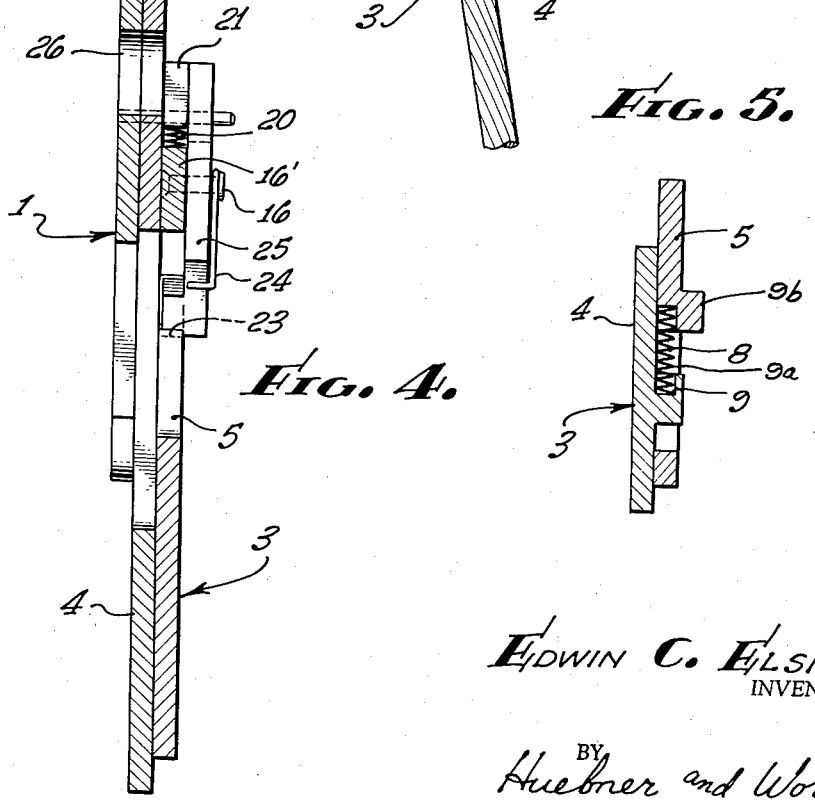
EDWIN C. ELSNER
INVENTOR.
BY Huebner and Worrel
ATTORNEYS

United States Patent Office 2,965,409
Patented Dec. 20, 1960

2,965,409
RELEASE HOOK

Edwin C. Elsner, Glendale, Calif., assignor to Aeroquip Corporation, Jackson, Mich., a corporation of Michigan Filed Apr. 7, 1958, Ser. No. 726,678

3 Claims. (Cl. 294—83.1)

This invention relates to a cargo release hook which will automatically open and release a load when the weight of the load is removed. The hook is primarily designed for use in suspending a cargo load from a parachute and for opening the hook automatically when the load touches the ground so that the parachute is quickly detached from the load. However, the hook may just as easily be adapted for use by a parachutist, and it also has many other uses which will be apparent from the description hereinafter set forth.

When it is desired to discharge a cargo from an airplane in flight, the load is fastened by suitable means to a parachute, and the load and parachute are dumped from the airplane. The parachute opens, and the load is then suspended therefrom. When the load strikes the ground the parachute, of course, is still attached, and unless personnel on the ground is readily available in the immediate vicinity to promptly remove the parachute from the load, the load may be dragged over the ground and severely damaged. It will be recognized that damage to the load is an ever present danger, particularly in the Arctic regions where the ice-pack on which the load is landed is extremely rough, and where ground winds are often very strong and gusty, causing the parachute to drag the load along the surface of the ice pack, sometimes for substantial distances, with resulting load damage and frequently total loss thereof.

An object of the present invention is to provide a hook which will firmly hold a cargo load in suspended position under an open parachute, but will automatically and quickly open to permit prompt separation of the parachute from the load as soon as the cargo load strikes the ground.

Another object of the invention is to provide a device of the general character mentioned which is simple in design, easy and inexpensive to manufacture, positive in performance, and reusable.

A further object of the invention is to provide a cargo hook with a minimal number of parts which can be readily and securely mounted between a parachute and a cargo load, will tenaciously hold the load in position under the parachute when the parachute is released and opened, but will at the same time be adapted for prompt opening as soon as the weight drag of the load is released.

Another object of the invention is to provide a hook of the general character mentioned which is sturdy in construction and which may be easily reset for reuse.

Other readily suggested uses of the present invention are on cargo loading cranes, life-boat davits, and wherever else prompt, automatic set-down load release is desired.

The invention also comprises novel details of construction and novel combinations and arrangements of parts which will be apparent from the following description and drawings which, however, merely describe prevailing embodiments of the present invention and which are given for purposes of illustration and example only.

In the drawings:

Figure 1 is a side elevation of the hook in locked position without load suspension.

Figure 2 is a side elevation of the hook in operative position with a load suspended therefrom.

Figure 3 is a side elevation of the hook in open position.

Figure 4 is a cross-section taken on the line 4—4 of Figure 1.

Figure 5 is a cross-section taken on the line 5—5 of Figure 1.

The device, which is generally referred to as the release or cargo hook, comprises a body 1 on which is pivotally mounted by suitable means at 2, a hook 3 having an elongate, arcuate, somewhat crescent-shaped body 4 on which is also pivotally mounted at the same pivot point 2 a second elongate, arcuate, roughly crescent-shaped hook member 5. Said second hook member 5 has a trigger arm 6 extending upwards therefrom, said trigger arm 6 having a curved outer surface 7. Said second hook member 5 impinges on a spring 8 which is seated on and confined by a lug 9 protruding from the first hook member 3 and through a slot 9a in the second hook member 5. The spring 8 is also confined by a lug 9b protruding from the second hook member 5. The second hook member 5 also has a slot 10 in which is positioned a stud 11, mounted on and protruding from the first hook member 3 and serving to limit the pivotal motion of said second hook member 5 relative to the first hook member 3.

Said first hook member 3 also has pivotally mounted on it a key-shaped latch member 12 having a notch or shoulder 13, said latch member being pivotally mounted somewhat off-center on the end of the first hook member 3, opposite the pivotal mounting 2.

Rigidly mounted on or as part of the body 1 and in juxtaposition to the latch member 12 is a member 14 having a notch or shoulder 15 complementary to and designed to impinge on the notch 13 of the latch member 12 and to hold said latch member 12 in locked position when a locking means hereinafter described is in extended position.

Also pivotally mounted on the body 1 as at 16 is a locking bar 16' which, in the locked position without load suspension shown in Figure 1 and in the loaded position shown in Figure 2, impinges upon the tip of the curved outer surface 7 of the trigger arm 6 of the second hook member 5 as at 17, shown in Figure 1 and as at 18 shown in Figure 2. The opposite end of the locking bar 16' impinges upon the latch member 12 as at 19 when the hook is in the locked position shown in Figure 1, and in the loaded position shown in Figure 2. The locking bar 16' impinges on a spring 20 which is seated in the body 1 of the device as at 21.

Also pivotally mounted likewise at 16 on the locking bar 16' is a small dog 22 which, in the position shown in Figure 1 fits into an open slot 23 in the second hook member 5, thereby holding said member 5 in position with the spring 8 partially depressed and with the tip of the trigger arm 6 impinging on the locking bar 16' as at 17. The dog 22 is spring mounted with a leaf spring 24.

In the loaded position shown in Figure 2, the dog 22 is released from the slot 23 and forced upwards and out of operating position by the leaf spring 24, where the dog 22 remains until the device is again put into the locked position without load suspension shown in Figure 1.

The body member 1 may also have mounted on it a stop 25 which serves to aid in positioning the dog 22 in the slot 23 when the device is in the locked position without load suspension shown in Figure 1.

The body 1 may be provided with a hole 26 or other suitable means for attaching a line or cable 27 from the parachute, crane or davit, and when in the load suspension operative position shown in Figure 2, a line or cable 28 from the suspended load is mounted on the second hook member 5 and, by reason of the crescent shape of the hook member 5, will rest on said member 5 at a position such as 29.

In use the device is first loosely attached to a line or cable 27 from a parachute, crane or davit, and while the device is in open position a line or cable 28 from a load is placed over the second hook member 5. The hook members 3 and 5 are then swung upward, the latch member 12 and its notch 13 are brought into contact with the member 14 and its notch 15, the free end of the dog 22 is placed in the slot 23, the locking bar 16 is adjusted relative to the latch member 12 and the trigger arm 6, and the device is otherwise put into the locked position without load suspension shown in Figure 1. It will be recognized that in this position there is no strain or load tension on the line or cable 27 or on the line or cable 28.

When the device is being used for dropping a load from an airplane and thus suspending the load from a parachute, the load, the device in the locked position without load suspension shown in Figure 1, and the parachute are all ejected from the airplane. When the parachute opens by the automatic opening means in common use, tension is imparted to the line or cable 27, and the downward course of the load and device is retarded by the pull of the open parachute. The tension thus imparted to the line or cable 28 causes the second hook member 5 to drop downwards into the operative position with the load suspended therefrom shown in Figure 2. The dog 22 is thereupon released from the slot 23 and forced upwards and out of operating position by the leaf spring 24, and takes the position shown in Figure 2.

In this position the spring 8 is compressed, the trigger arm 6 holds the locking bar 16' in the firm locking position shown in Figure 2, and the notch 13 of the latch member 12 is securely held against the notch 15 of the member 14.

When the suspended load strikes the ground, load tension is released from the line or cable 28. The compressed spring 8 thereupon forces the second hook member 5 upwards, thereby causing the trigger arm 6 to move clear of the tip of the locking bar 16'. The locking bar 16', impelled by the compressed spring 20, thereupon swings into the position shown in Figure 3, clear of the trigger arm 6, and also clear of the latch member 12.

By reason of its slightly off-center structure, latch member 12 and its notch 13 then swings free and clear of notch 15 of member 14, permitting the first hook member 3 and second hook member 5 to pivot freely into the first partially opened position shown in Figure 3, and then to the full open position shown in dotted lines in Figure 3. The line or cable 28 is then free to slip off the second hook member 5 and clear of the entire device, thereby freeing the load from the parachute and the device.

It will be recognized that similar operations will occur if the device, instead of being used in dropping a load by parachute from an airplane, is used in connection with a crane or davit or otherwise used for automatic set-down load release.

While the instant invention has been shown and described herein in what is conceived to be the most practical and preferred embodiments thereof, it is recognized that departures may be made therefrom within the scope of the invention, which is therefore not to be limited to the details disclosed herein, but is to be accorded the full scope of the claims so as to embrace any and all equivalent devices.

Having thus described the invention, what I claim as new and desire to secure by Letters Patent is:

1. A release hook comprising: a body structure; a first crescent-shaped hook member pivotally mounted adjacent one end thereof to the body structure; a second crescent-shaped hook member slidably superimposed on the first hook member and pivotally mounted at one end thereof by the same pivot means; a spring seated on the first hook member and abutting against the second hook member so as to bias said second hook member to move in an upward direction; means opposing the action of said spring but releasable by downward movement of said second hook member upon application of weight thereto to release said second hook member for upward movement; a latch pivotally mounted on said first hook member adjacent the free end thereof, said latch having a protruding ear defining a shoulder; an element mounted on said body structure, having a protruding ear defining a shoulder adapted to receive the shoulder on said latch; a locking bar pivotally mounted intermediate its ends on the body structure and having an end abutting against said latch to prevent disengagement of said latch from said element; the other end portion of said locking bar engaging a movable portion of said second hook member and being releasably held in the described position thereby; and spring means mounted on said body structure and abutting against said locking bar to bias said locking bar into said engagement with said movable portion of said second hook member whereby upon release of weight from said second hook member upward movement thereof withdraws said movable portion from said locking bar and permits the same to swing free of said latch.

2. A release hook comprising: a body structure; a first crescent-shaped hook member pivotally mounted adjacent one end thereof to the body structure; a second crescent-shaped hook member slidably superimposed on the first hook member and pivotally mounted at one end thereof by the same pivot means; a trigger arm mounted on said second hook member and extending upwardly therefrom above the pivot means; a spring seated on the first hook member and abutting against the second hook member so as to bias said second hook member to move in an upward direction; means opposing the action of said spring but releasable by downward movement of said second hook member upon application of weight thereto to release said second hook member for upward movement; a latch pivotally mounted on said first hook member adjacent the free end thereof, said latch having a protruding ear defining a shoulder; an element mounted on said body structure, having a protruding ear defining a shoulder adapted to receive the shoulder on said latch; a locking bar pivotally mounted intermediate its ends on the body structure and having an end abutting against said latch to prevent disengagement of said latch from said element; the other end of said locking bar engaging said trigger arm and being releasably held in the described position thereby; and spring means mounted on said body structure and abutting against said locking bar to bias said locking bar into engagement with said trigger arm whereby upon release of weight from said second hook member upward movement thereof withdraws said said trigger arm from said locking bar and permits the same to swing free of said latch.

3. A release hook comprising a body structure; a first crescent-shaped hook member pivotally mounted adjacent one end thereof to the body structure; a second crescent-shaped hook member slidably superimposed on the first hook member and pivotally mounted at one end thereof by the same pivot means; a trigger arm mounted on said second hook member and extending upwardly therefrom above the pivot means; a first spring seated on the first hook member and abutting against the second hook member so as to bias said second hook member to move in an upward direction; a latch pivotally mounted on said first hook member adjacent the free end thereof, said latch having a protruding ear defining a shoulder; an element mounted on said body structure, having a protruding ear defining a shoulder adapted to receive the shoulder on said latch; a locking bar pivotally mounted intermediate its ends on the body structure and having an end abutting against said latch to prevent disengagement of said latch from said element; the other end of said locking bar engaging said trigger arm and being releasably held in the described position thereby; a second spring mounted on said body structure and abutting against said locking bar to bias said locking bar into abutting position against said trigger arm; and a spring actuated dog pivotally mounted on said locking bar adjacent one end of said dog and having its other end abutting against the second hook member and opposing the action of said first spring, said dog pivoting free of said second hook member when weight is first applied to said second hook member to thereby release said second hook member for upward movement to withdraw said trigger arm from said locking bar when said weight is thereafter removed from said second hook member.

References Cited in the file of this patent
UNITED STATES PATENTS

| | | |
|---|---|---|
| 2,667,376 | Schlachter | Jan. 26, 1954 |
| 2,758,867 | Elsner | Aug. 14, 1956 |
| 2,868,580 | Stevens et al. | Jan. 13, 1959 |